Feb. 21, 1928. 1,660,045
P. W. PETERSEN
APPARATUS FOR HANDLING COMESTIBLES
Filed April 4, 1923  2 Sheets-Sheet 2
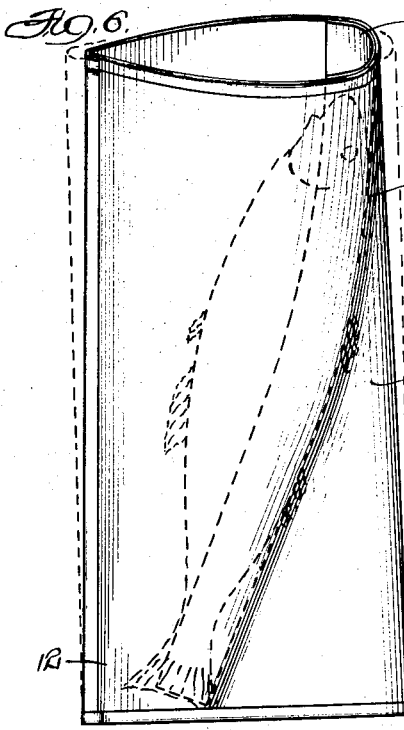
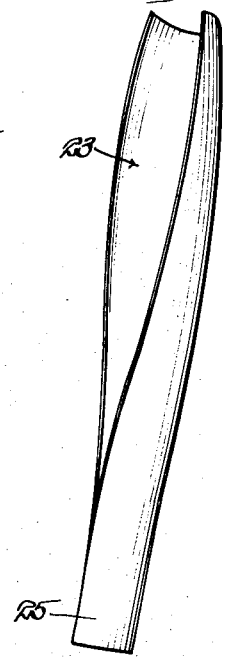
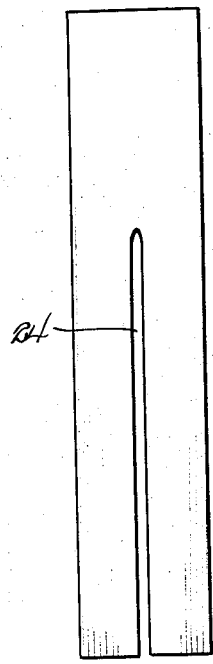
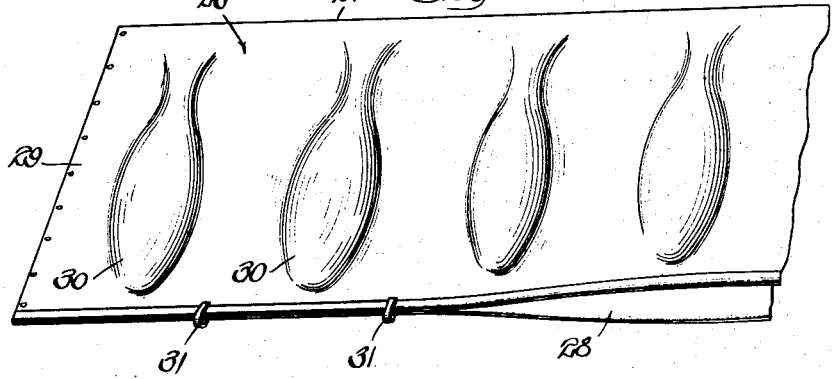
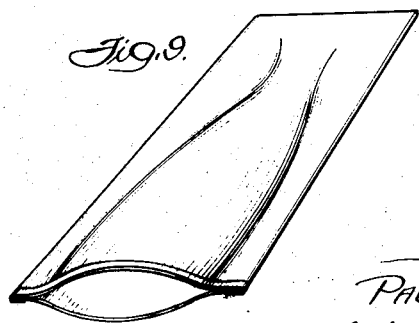
Inventor:
PAUL W. PETERSEN
By Jones, Addington, Ames + Seibold
Attys.
Witness:
P. Haselton Patented Feb. 21, 1928.

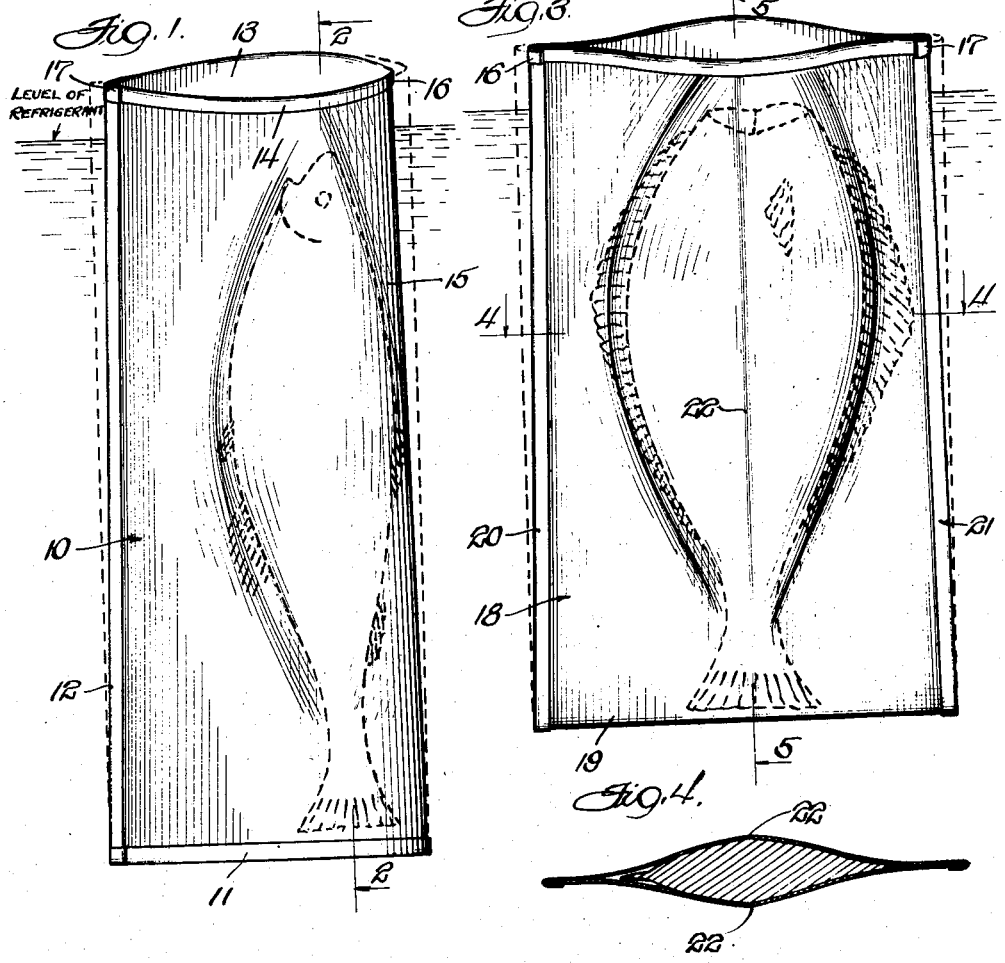

1,660,045

UNITED STATES PATENT OFFICE.

PAUL W. PETERSEN, OF BAY CITY, MICHIGAN.

APPARATUS FOR HANDLING COMESTIBLES.

Application filed April 4, 1923. Serial No. 629,780.

This invention relates to methods and apparatus for handling comestibles and more particularly to methods and apparatus used in connection with the refrigerating of individual units of the comestible.

During the course of my investigations in this field, I have found it to be highly desirable to follow certain well defined rules when cooling or freezing certain comestibles. Many comestibles, as for example fish, should preferably be chilled or frozen very rapidly, once the process has begun. Otherwise, my experience in this field has shown that the natural texture and appearance of the comestible will be seriously altered, thus rendering the comestible less desirable and less marketable.

Furthermore, my investigations have indicated that, when a liquid refrigerant such as brine is utilized, it is desirable that the comestibles should not come into direct contact with the refrigerant, because of the possible deleterious effects of the refrigerant upon the edible, and because after repeated use the refrigerant may become polluted with impurities.

It has furthermore been my experience that it is desirable when freezing sizable individual units of a comestible to enclose or support such units in individual containers in a manner such that the natural shape and appearance of the comestible will be substantially retained when in the frozen condition.

With the above requirements in mind, I have developed a process and apparatus, the more particular objects of which will now be stated.

One particular object of this invention is to provide a container for receiving comestibles to be frozen or cooled by a refrigerant, which container shall be made of a thin layer of material which will readily permit rapid transfer of heat from the comestible to the adjacent refrigerant.

A further object of this invention is to provide a container for the above indicated purposes, which shall be made of flexible and elastic material in a manner such that the container is to a certain degree self-conformative to the contour of the comestible contained therein and which is made to a further degree conformative to the shape of the comestible by immersion or partial immersion in a liquid refrigerant, as a result of the pressure of the liquid upon the container walls. The advantages of such a conformative container are very marked since it permits the comestible to be brought into intimate and direct contact at large areas of its surface, except for the thin intervening wall of the container, with the refrigerant. Thereby any appreciable quantities of air or gas which would constitute effective insulation against the transfer of heat are excluded from the container and the transfer of heat is permitted to take place very rapidly, resulting in very rapid freezing.

Furthermore, such a conformative container serves to maintain the approximate natural shape of the comestible during the entire freezing process whereby the comestible when finally frozen substantially retains its natural shape and is consequently of a more pleasing and marketable appearance.

A further object of this invention is to provide containers possessing the above described advantages which are especially adaptable for reception of certain particular types or shapes of fish.

A still further object of this invention is the provision of a process or method for refrigerating comestibles which shall conform to the above pointed out requirements and advantages.

Another object of this invention is to provide a container of the character indicated which shall be convenient and durable in use and economical and simple in construction.

Other objects of the invention will become apparent from the following description, the accompanying illustrations and the appended claims.

For the purpose of illustration and description, several specific embodiments of this invention are shown in the accompanying drawings, in which—

Figure 1 is a perspective view of one form of structure embodying this invention;

Fig. 2 is a sectional view taken substantially upon the line 2—2 of the structure as shown in Fig. 1;

Fig. 3 is a perspective view of another form of structure also embodying certain features of the invention;

Figs. 4 and 5 are sectional views taken substantially upon the lines 4—4 and 5—5 respectively of the structure shown in Fig. 3;

Fig. 6 illustrates a structure of the type shown in Fig. 1 but provided with a means for retaining a fish in a desirable position within such a container;

Fig. 7 is a detail view of the fish retaining means indicated in Fig. 6;

Fig. 8 is a developed view of the retaining means;

Fig. 9 illustrates a modified form of structure embodying certain features of the invention; and Fig. 10 illustrates a structure embodying a plurality of compartments of the general character shown in Fig. 9.

The structure illustrated in Fig. 1 comprises a container 10 formed of a single sheet of flexible material, such as sheet iron or other metal or material which preferably possesses semi-rigidity, high tensile strength, elasticity and high heat conductivity. This sheet of material should preferably be comparatively thin, No. 24 to 30 gauge being suitable in most instances. A rectangular sheet of the material may be bent approximately along one of its center lines so that two substantially coextensive halves are bent upon each other to form a two ply article, as shown. The resulting corresponding bottom and side edges 11 and 12 may be crimped or rolled back upon themselves, as shown, or sealed together in any other suitable manner to form a liquid tight container or envelope. The upper end at 13 remains open. The upper edges 14 may be turned outwardly and downwardly upon themselves and when thus formed their interference with the insertion of the comestible is minimized.

It will be noted that a rounded edge at 15 is formed by the longitudinal bend in the sheet material whereas the opposite edge 12 naturally assumes the shape of a somewhat sharp ridge. This particular form of container accordingly has a cross section conforming to the shape of salmon, or like fish, the rounded back of the salmon conveniently fitting into the rounded edge 15 while the flattened stomach portion fits into the portion of the container nearer to the edge 12.

When it is desired to insert a fish or other comestible into the container it is merely necessary to press upon the edges of the container at points 16 and 17 whereby the upper end of the container will be expanded into the shape illustrated and will thus assume a cross section suitable to receive with ease the fish or other comestible unit. After the comestible unit is inserted, the container will tend to revert to its original shape, thereby closing tightly around the unit. If the container is used in connection with the refrigeration of fish, it is preferable to insert the tail end of the fish first in order that the container will conform as closely as possible with the shape of the fish.

As appears in Fig. 2, the lower portion of the container will assume a tapered form approximating that of the tail of a fish while the upper portion of the container, after the insertion of the fish, will become slightly restricted and will thus to some extent conform to the taper of the head of the fish.

In Figs. 3, 4 and 5, a modified type of container 18 is illustrated which is also constructed of sheet metal in a manner similar to the container 10, but however, is formed in a way to provide a suitable shape for a fish or other comestible having two sharp longitudinal ridges, such as is the case with halibut. In forming the container 18, a long rectangular sheet of material is sharply bent along a transverse line in order to form the bottom edge 19, as shown. With this modification, both longitudinal or side edges 20 and 21 may be sealed in a manner similar to the edge 12 of the container 10. This design provides an easily constructed container having two sharp ridges as shown, one of which conveniently receives the back portion and back fin of the halibut or like fish, while the other edge serves to receive the stomach portion and fins as best indicated in Fig. 4. If desired the walls of the container when used for halibut may be joined with slight creases as indicated at 22 which correspond to similar protrusions found on the body of the fish.

In Fig. 6 a container similar to that of Fig. 1 is illustrated and is shown provided with a support 23 which extends diagonally down and across the container from the rounded edge 15 to the sharp edge 12. This support may comprise a rectangular piece of sheet metal as illustrated in Fig. 8 provided with a longitudinal central slit 24 extending for approximately two thirds of its length. The sheet metal may be bent into the form of a trough as indicated in Fig. 7 having a substantially closed end as at 25 conforming to the tapered lower end of the container 10.

A fish may be placed in position upon the support either before or after the support is inserted in the container. The slit 24 permits the support to be bent into a shape approximating that of the back of the fish and also into a shape which will readily assume the diagonal position in the container 10 as illustrated. The back fins and part of the tail may extend through the slit portion 24 and may be thus retained in their proper shape during the freezing process. An important advantage in the use of the support 23 resides in its function of holding the tapered tail portion of the fish at a position nearer the sharp edge 12 of the container 10. A very large portion of the surface area of the fish is accordingly brought into close contact with the container walls which not only permits rapid freezing but causes the less rigid portions of the fish such as the fins and tail portion to be frozen in their natural shape.

In Fig. 9 a modified form of container is illustrated, the side walls of which have been formed by appropriate dies into a shape approximating that of the fish or other comestible to be inserted therein. Such a container is desirable for use in refrigerating a large number of fish of uniform size and shape since the proper contour of the walls shape may then be very accurately predetermined. With this form of container any slight variations in shape and size may still be compensated for by its flexibility, especially when the pressure of the surrounding liquid refrigerant is exerted upon the walls.

In Fig. 10 an apparatus is illustrated comprising a plurality of containers of predetermined form. Such an apparatus will greatly facilitate the rapid carrying out of the refrigerating process since a plurality of the comestible units may be handled simultaneously. This apparatus comprises a sheet of metal 26 bent longitudinally upon itself forming a closed edge at 27 and an open side 28. The ends as at 29 may be permanently sealed together in any suitable water-tight manner. The superimposed portions of sheet metal may be formed with oppositely extending corresponding embossed portions as at 30 conforming to a predetermined shape and size of comestible unit which is to be inserted therein. In using this apparatus the comestible units may be individually inserted in the embossed portions 30 and the open side 28 may then be closed by the use of spring clips as at 31. The group of attached compartments comprising the apparatus may then be inserted in a refrigerating liquid in a manner similar to the method of using the containers above described.

It will be obvious from the above various descriptions and the illustrations that the use of such containers will permit the bulk of each fish or comestible to be brought into very close proximity of the refrigerant bath by simply lowering the containers into the refrigerant substantially on a level with or above the top of the comestible therein and thus sufficiently to immerse the larger portion of the surface of the containers. The container being composed of flexible material will conform approximately to the shape of the fish or other unit of comestible, and in the case of fish, ample provision is made for the fins and tail to extend in substantially their natural shape in which position they are retained during the freezing process. When the containers are immersed in the liquid refrigerant, the pressure of the liquid against the container walls will serve to urge the walls into still more close contact with the fish. As a result, substantially all air or gas (which possesses high heat insulating properties) will be forced out of the containers. The containers being composed of a thin sheet of material, the comestible will accordingly be in a position to very rapidly impart its heat to the surrounding refrigerant. I have found when this method and type of container is used with a given refrigerating temperature that sufficient transfer of heat to effect freezing will take place several times as rapidly as when other methods are followed in which the heat must be conducted and transferred through appreciable layers or volumes of air or gas. When the containers are removed from the refrigerant, the walls being elastic will tend to spring back to the shape existing before immersion, and in many cases this action is sufficient to release the frozen comestible from the container walls without thawing.

I desire to have it understood that the apparatus and process comprising my invention are capable of use with other comestibles than the particular fish which have herein been cited merely as illustrative, and furthermore, while I have herein described in detail several embodiments of the structure comprising my invention, it is to be understood that I desire only such limitations placed thereupon as may be required by the prior art and as are set forth in the appended claims.

What I claim as new and desire to secure by Letters Patent of the U. S. is:—

1. A container for fish or comestible units of like shape which comprises flexible but self-supporting sheet metal bent longitudinally upon itself and with certain of the resulting corresponding edges sealed together to form an envelope with an opening at its top edge, the edge formed by the longitudinal bend being rounded, the edge opposite said bend and the bottom edge being sealed in the shape of sharp ridges.

2. A container for fish or comestible units of like shape which comprises a sheet of flexible material bent longitudinally upon itself and with certain of the resulting corresponding edges sealed together to form an envelope with an opening at its top edge, the edge formed by the longitudinal bend being rounded, the edge opposite said bend being sealed in the shape of a sharp ridge, and additional means for supporting the fish in its natural shape within the container.

3. A container for fish or comestible units of like shape which comprises a sheet of flexible material bent longitudinally upon itself and with certain of the resulting corresponding edges sealed together to form an envelope with an opening at its top edge, the edge formed by the longitudinal bend being rounded, the edge opposite said bend being sealed in the shape of a sharp ridge, and additional means for supporting the fish in its natural shape diagonally within the container with the head portion adjacent the rounded edge and the tail portion extending downwardly toward the opposite edge.

4. A container for covering an integral unit of a comestible while being cooled in a refrigerating bath, which comprises flexible sheet material fashioned in the form of an envelope substantially conformative to the contour of the unit contained therein, and additional means for positioning the unit within the container.

In witness whereof, I have hereunto subscribed my name.

PAUL W. PETERSEN.